United States Patent [19]
Crisp

[11] Patent Number: 6,109,330
[45] Date of Patent: Aug. 29, 2000

[54] BLIND FOR MOTOR-VEHICLE REAR WINDOW

[75] Inventor: Terence Sam Crisp, Keerbergen, Belgium

[73] Assignee: Peter Butz GmbH & Co. Verwaltungs-KG, Langenfeld, Germany

[21] Appl. No.: 08/944,540

[22] Filed: Oct. 7, 1997

[30] Foreign Application Priority Data

Oct. 9, 1996 [DE] Germany .......................... 196 41 554

[51] Int. Cl.[7] ...................................................... B60J 1/20
[52] U.S. Cl. ............................ 160/370.22; 160/DIG. 2; 296/97.8
[58] Field of Search .................... 160/266, 280, 160/291, 274, DIG. 2, 370.22; 296/97.4, 97.8

[56] References Cited

U.S. PATENT DOCUMENTS

| | | | |
|---|---|---|---|
| 1,481,491 | 1/1924 | Vineberg et al. | 160/370.22 X |
| 4,263,988 | 4/1981 | Inaba et al. | 187/29 |
| 4,836,263 | 6/1989 | Ament | 160/370.22 X |
| 4,898,224 | 2/1990 | Woodworth | 160/370.22 X |
| 5,172,745 | 12/1992 | Wang | 160/370.22 |
| 5,468,040 | 11/1995 | Peng Hsieh et al. | 160/370.22 X |
| 5,615,729 | 4/1997 | Matumoto et al. | 160/370.22 |
| 5,633,884 | 5/1997 | Lin | 160/370.22 |
| 5,653,278 | 8/1997 | Cheng | 160/370.22 |
| 5,752,560 | 5/1998 | Cherng | 160/370.22 |
| 5,791,721 | 8/1998 | Lin | 160/370.22 X |
| 5,848,634 | 12/1998 | Will et al. | 160/310 |

FOREIGN PATENT DOCUMENTS 0 221 573 5/1987 European Pat. Off. .
0240747 10/1987 European Pat. Off. .

*Primary Examiner*—Daniel P. Stodola
*Assistant Examiner*—Bruce A. Lev
*Attorney, Agent, or Firm*—Herbert Dubno; Andrew Wilford

[57] ABSTRACT

A blind for a motor-vehicle rear window has a support, a roller rotatable in the support about a roller axis, and a motor mounted on the support and connected to the roller for rotating same about its axis. A flexible shade has one edge attached to the bar and an opposite edge attached to the roller. a pair of one-piece arms have outer ends slidable along the guide bar and inner ends spaced apart along the roller axis and pivoted on the support about respective arm axes transverse to the roller axis. Respective springs braced between the inner arm ends and the support urge the arms about the respective axes in a direction moving the outer arm ends away from the support.

13 Claims, 2 Drawing Sheets

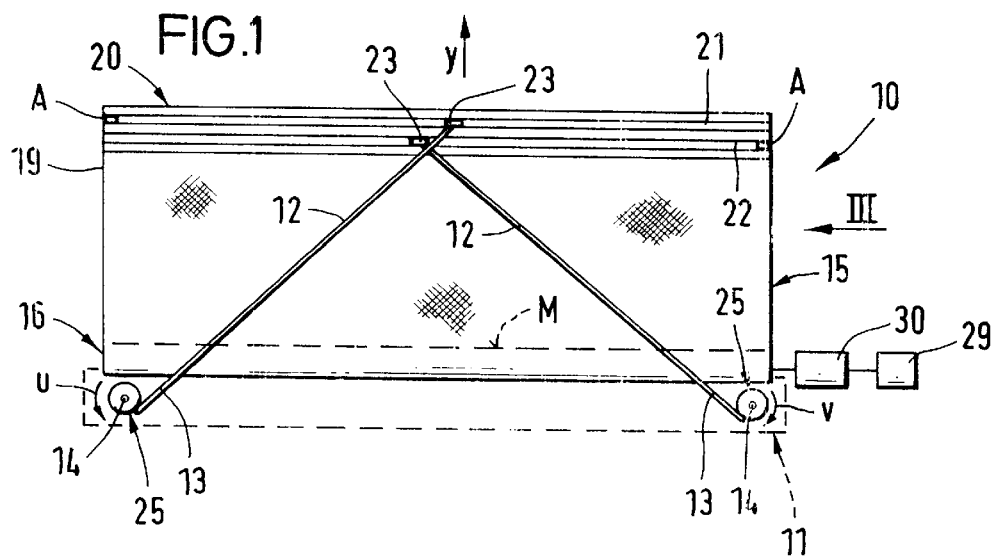
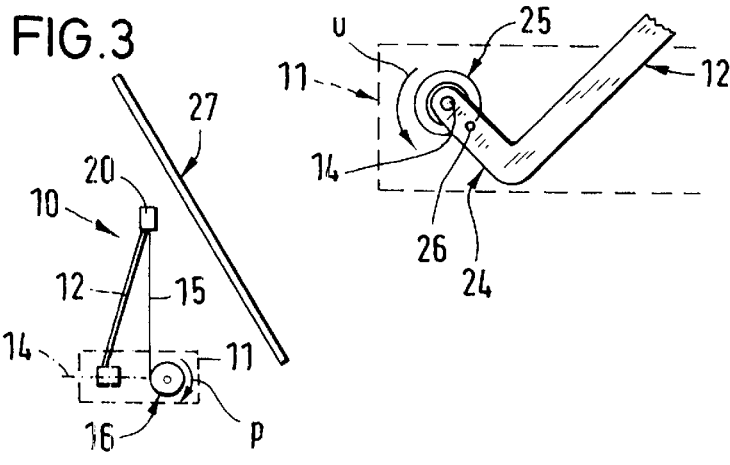
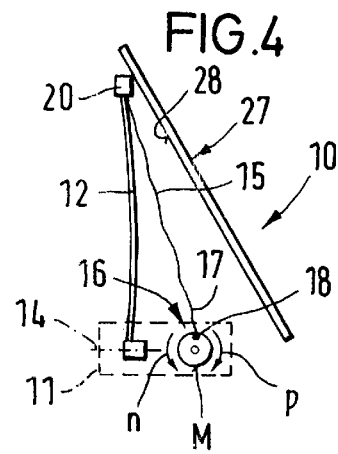
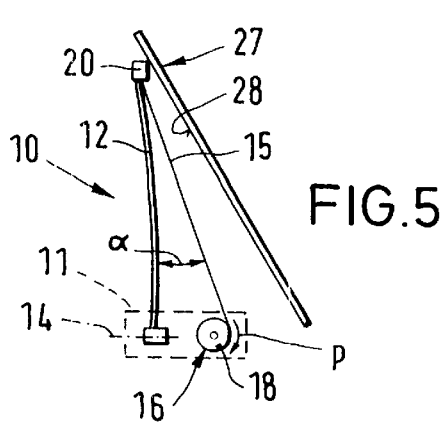
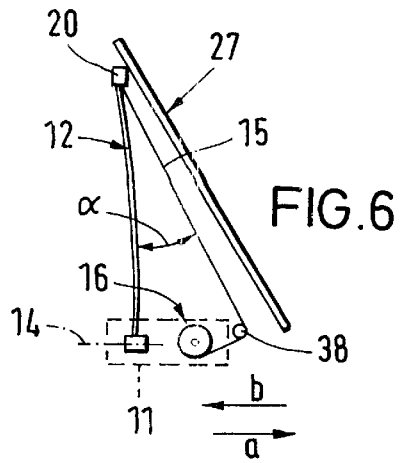

BLIND FOR MOTOR-VEHICLE REAR WINDOW

FIELD OF THE INVENTION

The present invention relates to a window blind. More particularly this invention concerns a motorized self-deploying and -retracting window blind for a motor-vehicle rear window.

BACKGROUND OF THE INVENTION

A window blind for a motor-vehicle rear window as described in European patent 0,221,573 of E. Walter has a support, a roller rotatable in the support about a roller axis, and a motor mounted on the support and connected to the roller for rotating same about its axis. A flexible shade has one edge attached to a bar and an opposite edge attached to the roller. A pair of arms have outer ends pivoted on the bar, inner ends pivoted on the support about respective arms axes transverse to the roller axis, and central pivots so that the arms can fold in half. Respective springs provided at the central pivots urge the arms into straight positions moving the outer arm ends away from the support and stretching the shade tight between the bar and the roller.

Such a shade is deployed by rotating the roller in a direction allowing the arms to move under the force of their springs into relatively straight positions, pushing out the bar and stretching the shade between the roller and the bar. The shade is retracted by oppositely rotating the roller so that the bar is pulled in and the arms are folded under the retracted shade. Such an arrangement is fairly complex. The arms, if fully extended, must be acted on with considerable longitudinal force to fold them, at least to start with, and these arms are fairly fragile.

Similarly, European patent 0,240,747 described a similar system having a spring motor attached to the roller. This spring motor is loaded or wound up as the shade is would up so that the shade can be deployed simply by releasing the spring motor so it unwinds the shade which will then naturally be erected. This spring motor is relatively bulky, so that the complete blind system is often too big to install neatly.

OBJECTS OF THE INVENTION

It is therefore an object of the present invention to provide an improved blind for a motor-vehicle rear window.

Another object is the provision of such an improved blind for a motor-vehicle rear window which overcomes the above-given disadvantages, that is which is of relatively simple and robust construction and which is also fairly compact.

SUMMARY OF THE INVENTION

A blind for a motor-vehicle rear window has according to the invention a support, a roller rotatable in the support about a roller axis, and a motor mounted on the support and connected to the roller for rotating same about its axis. A flexible shade has one edge attached to the bar and an opposite edge attached to the roller. According to the invention a pair of one-piece arms have outer ends slidable along the guide bar and inner ends spaced apart along the roller axis and pivoted on the support about respective arm axes transverse to the roller axis. Respective springs braced between the inner arm ends and the support urge the arms about the respective axes in a direction moving the outer arm ends away from the support.

Each arm in accordance with the invention is L-shaped with a short bent end portion forming the respective inner end and engaging the respective spring. The springs are each torque springs having one end bearing on the respective arm and another end bearing on the support. These torque springs are basically cylindrical and centered on the respective arm axes.

Means is provided according to the invention for retaining the arms in a position extending away from the support with the shade stretched between the guide bar and the roller. This means can be a simple self-locking transmission between the motor and the roller. Alternately it can be a magnet lock on the motor. In another arrangement it includes a controller for operating the motor in a predetermined rotational sense to unwind the shade from the roller and to continue motor operation in this predetermined rotational sense after unwinding of the shade until the motor stalls. The retaining means can also be a torsion spring connected between the motor and the roller. In another system tension is created by a rod and means for pressing the tensioning rod transversely against the shade. In this last case the motor comprises the means for pressing.

The arm pivots and roller according to the invention are so positioned that the shade extends in an extended position of the arms at an acute angle to a plane defined by the arms. Furthermore each arm is elastically deformable.

In accordance with a further feature of the invention means is provided for mounting the roller on the support for limited movement of the roller on the support in a direction transverse to the roller and arm axes. A switch is connected to the motor and operable by the roller on displacement relative to the support in the direction on taut spanning of the shade between the guide bar and the roller. This switch shuts down the motor which according to the invention is electric and reversible.

BRIEF DESCRIPTION OF THE DRAWING

The above and other objects, features, and advantages will become more readily apparent from the following description, reference being made to the accompanying drawing in which:

FIG. 1 is a partially schematic front view of the blind according to the invention in a partially deployed position;

FIG. 2 is a large-scale view of a detail of FIG. 1;

FIGS. 3, 4, and 5 are side views taken in the direction of arrow III of FIG. 1 illustrating the blind in successive positions as it is deployed;

FIG. 6 is a view like FIG. 5 of a variation on the blind according to the invention;

SPECIFIC DESCRIPTION

Figure 8:
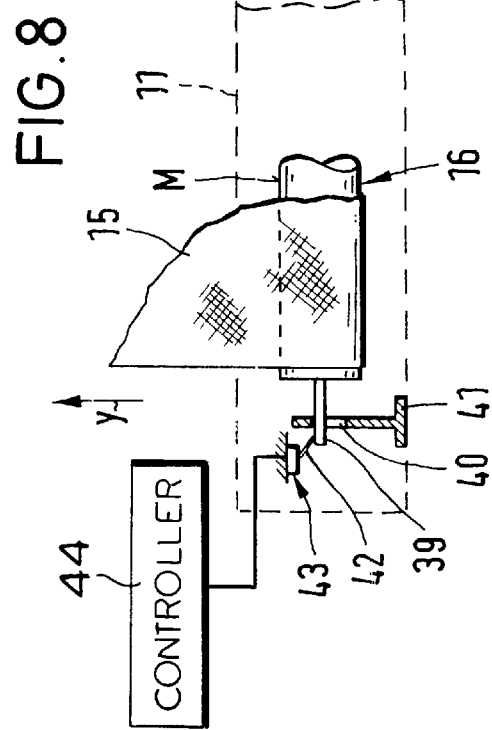
FIG. 8 is a partly diagrammatic front view of a detail of the blind.

As seen in FIGS. 1 through 5 a window shade 10 according to the invention has a base or support 11 that is fixed in the motor vehicle, normally recessed in the horizontal surface or seat back beneath a rear window 27. Two one-piece and straight arms 12 each have a lower end pivoted at 14 in the support 1 for rotation about axes parallel to the normal vehicle direction of travel. A flexible sheet forming a shaded 15 has a lower end 17 connected at 18 to an outer surface M of a roller 16 rotatable in the support 11 about a horizontal axis perpendicular to the axes 14. A support part 19 of the shade 15 is secured to a rigid elongated guide bar 20 formed with a pair of guide slots or tracks 21 and 22 extending parallel to the roller 16 and holding respective slide blocks 23 attached to the upper ends of the respective arms 12. Abutments A are provided at the ends of the guide slots 21 and 22 to prevent the slide blocks 23 from exiting them.

The lower ends 13 of the arms 12 have as shown in FIG. 2 and L-shape with a bent-in portion 24 to which is secured one end 26 of a torsion spring 25 whose other end is fixed to the support 11. The spring 25 is prestressed such that it normally urges the respective arm 12 in a rotational sense u or v tending to raise the shade 15 up in a deploying direction y.

Figure 7:
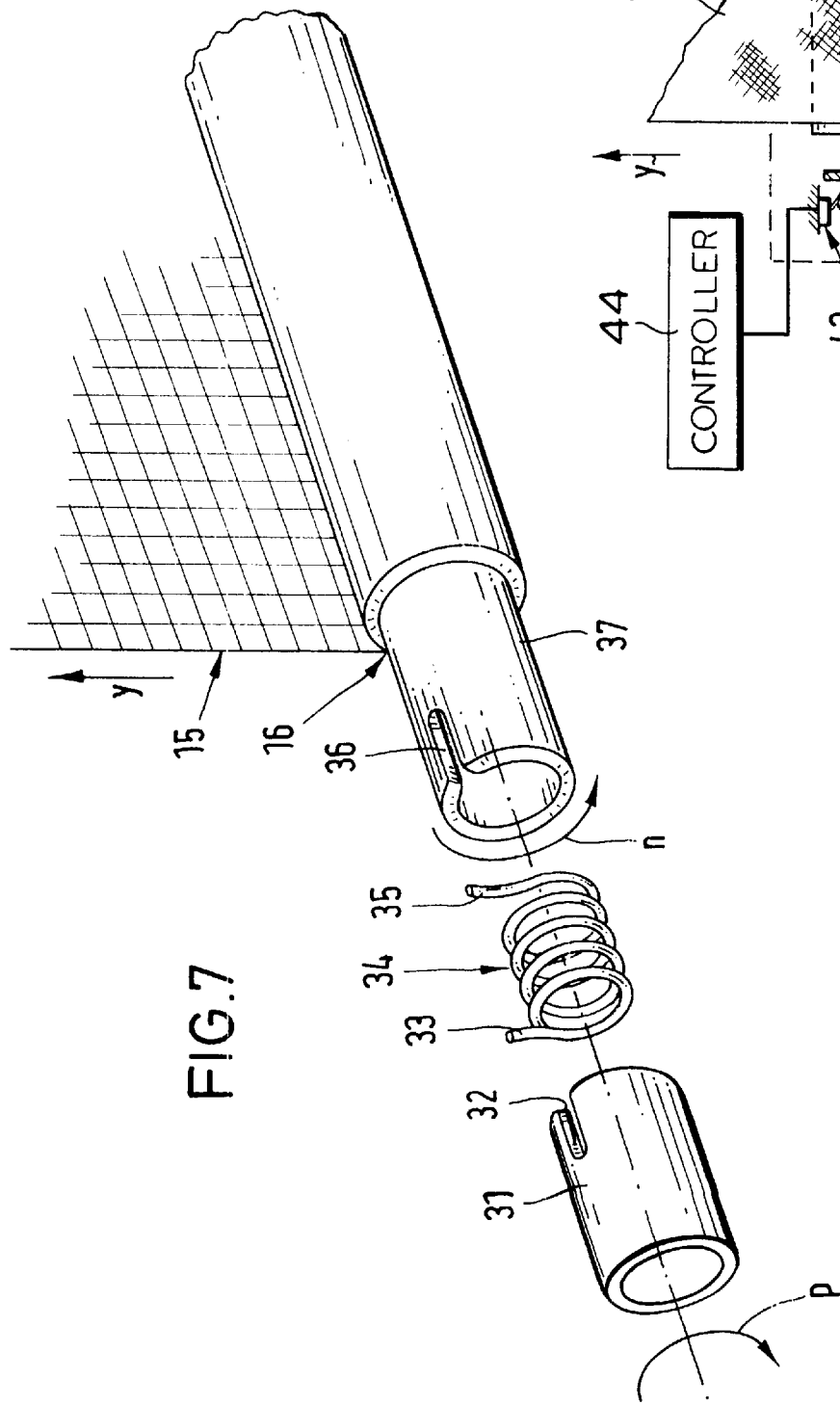
FIG. 7 is a large-scale perspective and exploded view of a detail of the blind in accordance with the invention.

A reversible electric motor 29 is connected through a self-locking drive or transmission 30, here a worm drive, to the roller 16 to rotate it in a direction n to retract the shade 15 and in a direction p to deploy it. This motor 29 may alternately have a magnet lock, either built in or connected to the roller 16, to retain the shade 25 in a deployed position. As illustrated in FIG. 7, the motor 30 can be connected to an end piece 31 formed with a slot 32 fitted to one end 33 of a torque spring 34 whose other end 35 is fitted in a slot 36 of an end part 37 fixed on the roller 16. A shaft 39 (FIG. 8) extends through the tube forming the roller 15 and through the parts 31 and 34 to keep them coaxial. This torque spring 34 is set such that when the motor 30 rotates in the deploying direction n it loads the spring 34.

The shaft 39 supporting the roller 16 is fitted at each end through a slot 40 extending parallel to the deploying direction 7 in a bracket 41 fixed in the support 11. An arm 42 of a microswitch 43 is connected to a controller 44 that operates the reversible motor 30.

The window blind 10 described above operates as follows:

To deploy the shade 15 the motor 29 is energized by the controller 44 to rotate the roller 16 in the deploying direction p. This action first loads the spring 34 and then rotates the roller 15 in the direction p so the shade 15 and bar 20 rise up in the deploying direction y. THe arms 12 counterrotate in the directions u and v, in which they are urged by their springs 25, and the slide blocks 23 move toward the center of the respective guide slots 21 and 22.

At first the bar 20 rises straight up as shown in FIG. 3 and then as shown in FIG. 4 the bar 20 strikes an inner surface 28 of the angled rear windshield. During further deployment the shade 15 is first slack as shown in FIG. 4 and, when fully deployed is taut as shown in FIG. 5. The springs 25 and 34 hold the shade 15 taut and pull up the roller 16 to lift the shaft 39 and operate the switch 43 so that the controller 44 shuts down the motor 30. When fully deployed the arms 12 extend virtually parallel to each other and the slide blocks 23 engage the respective abutments A. The motor 29 may continue to rotate somewhat after the shade is fully deployed to make the shade 15 taut.

To retract the shade 15 the motor 30 is energized to rotate in the roller 16 in the retracting direction p. This pulls the bar 20 down, at first along the window surface 28 and then straight down, until the bar 20 is seated on or recessed in the support 11.

As illustrated the shade 15 and arms 12 form a small acute angle α with each other. This angle α can be increased as shown in FIG. 6 by providing a deflecting roller 38 over which the shade 15 passes between the roller 16 and the window 6. This roller 38 is either spring loaded outward in direction a or can be moved in this direction a and an opposite direction b by the motor 30 to hold the shade 15 taut and generally parallel to the window 27.

What is claimed is:

1. A blind for a motor-vehicle rear window, the blind comprising:

a support;

a roller rotatable in the support about a roller axis;

drive means including a motor mounted on the support and connected to the roller for rotating same about its axis;

a guide bar;

a flexible shade having one edge attached to the bar and an opposite edge attached to the roller;

a pair of one-piece arms having outer ends slidable along the guide bar and inner ends spaced apart along the roller axis and pivoted on the support about respective arm axes transverse to the roller axis; and respective independent torque springs each having one end bearing on the respective inner arm end and another end bearing on the support for independently urging the arms about the respective axes in a direction moving the respective outer arm end away from the support.

2. The blind defined in claim 1 wherein each arm is L-shaped with a short bent end portion forming the respective inner end and engaging the respective spring.

3. The blind defined in claim 1 wherein the torque springs are basically cylindrical and centered on the respective arm axes.

4. The blind defined in claim 1, further comprising means for retaining the arms in a position extending away from the support with the shade stretched between the guide bar and the roller.

5. The blind defined in claim 4 wherein the retaining means is a self-locking transmission between the motor and the roller.

6. The blind defined in claim 4 wherein the retaining means is a magnet lock on the motor.

7. The blind defined in claim 4 wherein the retaining means includes control means for operating the motor in a predetermined rotational sense to unwind the shade from the roller and to continue motor operation in this predetermined rotational sense after unwinding of the shade until the motor stalls.

8. The blind defined in claim 4 wherein the retaining means includes a torsion spring connected between the motor and the roller.

9. The blind defined in claim 1 wherein the arm pivots and roller are so positioned that the shade extends in an extended position of the arms at an acute angle to a plane defined by the arms.

10. The blind defined in claim 1, further comprising:

mounting means supporting the roller on the support for limited movement of the roller on the support in a direction transverse to the roller and arm axes; and a switch connected to the motor and operable by the roller on displacement relative to the support in the direction caused by taut spanning of the shade between the guide bar and the roller.

11. The blind defined in claim 1 wherein the motor is electric and reversible.

12. A blind for a motor-vehicle rear window, the blind comprising:

a support;

a roller rotatable in the support about a roller axis;

drive means including a motor mounted on the support and connected to the roller for rotating same about its axis;

a guide bar;

a flexible shade having one edge attached to the bar and an opposite edge attached to the roller;

a pair of one-piece arms having outer ends slidable along the guide bar and inner ends spaced apart along the roller axis and pivoted on the support about respective arm axes transverse to the roller axis;

respective springs braced between the inner arm ends and the support for urging the arms about the respective axes in a direction moving the outer arm ends away from the support; and means for retaining the arms in a position extending away from the support with the shade stretched between the guide bar and the roller, the retaining means including:
a deflecting roller, and
means for pressing the deflecting roller transversely against the shade.

13. The blind defined in claim 12 wherein the motor comprises the means for pressing.

\* \* \* \* \*